(12) United States Patent
Seo et al.

(10) Patent No.: US 7,406,054 B2
(45) Date of Patent: Jul. 29, 2008

(54) ROUTING METHOD FOR WIRELESS NETWORKS

(75) Inventors: Eun-il Seo, Suwon-si (KR); Sung-woo Cho, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 407 days.

(21) Appl. No.: 11/123,199

(22) Filed: May 6, 2005

(65) Prior Publication Data

US 2005/0249155 A1 Nov. 10, 2005

(30) Foreign Application Priority Data

May 6, 2004 (KR) .................. 10-2004-0031857

(51) Int. Cl.
*H04L 12/28* (2006.01)
*H04Q 7/00* (2006.01)

(52) U.S. Cl. .............. 370/256; 370/408; 370/238; 370/328; 370/235; 370/392

(58) Field of Classification Search .......... 370/235, 370/238, 256, 328, 392, 408
See application file for complete search history.

(56) References Cited

U.S. PATENT DOCUMENTS

2005/0036486 A1* 2/2005 Sahinoglu et al. ........... 370/389
2005/0135379 A1* 6/2005 Callaway et al. ....... 370/395.31

* cited by examiner

*Primary Examiner*—Barry W Taylor
(74) *Attorney, Agent, or Firm*—Sughrue Mion, PLLC

(57) ABSTRACT

A routing method is used to establish a data transfer path between a source node and a destination node in wireless networks having a tree structure. If a relay node relaying a data transfer receives data to be forwarded from a source node to a destination node, the routing table is searched to check whether the routing table stores information on a path to the destination node, and the received data is forwarded along a corresponding path if the path information to the destination node exists. However, if the information on a path to the destination node does not exist in the routing table, the routing table is searched to check whether the routing table stores information on a path to a parent node of the destination node, and; if the path information exists, the received data is forwarded along the path to the parent node.

5 Claims, 6 Drawing Sheets

FIRST CHILD NODE TREE    SECOND CHILD NODE TREE    THIRD CHILD NODE TREE

FIRST CHILD NODE TREE    SECOND CHILD NODE TREE    THIRD CHILD NODE TREE

FIRST CHILD NODE TREE   SECOND CHILD NODE TREE   THIRD CHILD NODE TREE

ROUTING METHOD FOR WIRELESS NETWORKS

CROSS-REFERENCE TO RELATED APPLICATIONS

This application claims priority from Korean Patent Application No. 10-2004-0031857, filed on May 6, 2004, the entire content of which is incorporated herein by reference.

BACKGROUND OF THE INVENTION

1. Field of the Invention

Methods consistent with the present invention relate to routing, and more particularly, to routing which establishes a data transfer path from a source node to a destination node in a wireless personal network such as a Zigbee network.

2. Description of the Related Art

A personal area network (PAN), as contrasted with a local area network (LAN) or a wide area network (WAN), enables each individual to have a unique network of his own. That is, devices owned by individuals each constitute one network for the purpose of their convenience. As an effort to achieve such a PAN implemented in a wireless manner, the IEEE 802.15 Working Group defines the Wireless Personal Area Network (WPAN) as the short-range wireless network standards, and has four Task Groups (TG) thereunder.

IEEE 802.15.1 defines the well-known Bluetooth technology standards, and IEEE 802.15.3 and IEEE 802.15.3a define the high-rate WPAN standards. IEEE 802.15.4, called "Zigbee", defines the low-rate WPAN standards, the data rate of which is no more than 250 Kbps.

One of the important tasks of the Zigbee Network Group is to define a efficient routing method for a wireless sensor network. An On-Demand routing method, such as Ad hoc On Demand Distance Vector (AODV) routing, can establish an efficient path in an Ad hoc-type wireless network, but such a routing method requires each node to have a routing table in order for the node to forward data packets. However, most wireless sensors have a limited amount of memory space, so there exist difficulties in building the routing table in the memory space.

Meanwhile, a tree routing method can solve such a memory-limitation problem. However, the tree routing method based on the tree structure is not efficient, in one aspect, in establishing a path, so the routing method for the Zigbee wireless network has not been standardized up to now.

FIG. 1 is a view for explaining a conventional routing method based on the tree routing. In FIG. 1, a node E indicates a source node (src) and a node I indicates a destination node (dest). Further, the sign "+" is marked on nodes having a routing table, the sign "−" is marked on nodes having no routing table, and the same signs are marked in the remaining drawings.

In FIG. 1, the source node E forwards data to a node B which is a parent node of the node E. The node B buffers the data received from the node E, broadcasts a route request (RREQ) packet, and searches for a path. The RREQ packet is repeatedly broadcast to a node D so that the path is searched for. The node D is aware that the destination node I is its child node, and unicasts the RREQ packet to the node I. The node I responds to the unicast RREQ packet with a route reply (RREP) packet. The node B receives the RREP packet, stores a searched path in the routing table, and forwards buffered data.

However, as shown in FIG. 1, in the situation that the node B forwards data to a node N, the routing method used in the wireless network, such as a Zigbee network, searches for a path, as aforementioned, even when the node B is aware of information on paths to the node I. Likewise, a node G, which is a child node of the node C, searches for a path in the same way as above even when forwarding data to the node N.

That is, even when there has been the previously searched path to the parent node I of the node N, the routing method as above looks for a path without considering the searched path. Accordingly, the routing method repeats unnecessary broadcasts for a path even though the previously searched path is available, which increases the overhead on a network to delay the entire data delivery.

SUMMARY OF THE INVENTION

An aspect of the present invention is to provide a routing method for wireless networks capable of establishing a data transfer path while minimizing unnecessary path searches by using a previously searched path.

According to an aspect of the present invention, there is provided a routing method for wireless networks of a tree structure for establishing a data transfer path between a source node to a destination node, comprising (a) receiving, by a relay node relaying a data transfer, data to be forwarded from the source node to the destination node; (b) forwarding the data received along a corresponding path if a routing table of the relay node stores information on a path to the destination node; (c) searching the routing table to check whether the routing table stores information on a path up to a parent node of the destination node if the routing table does not store information on a path up to the destination node; and (d) forwarding data received along a path up to the parent node if the routing table stores the information on the path up to the parent node of the destination node as a search result.

The routing method further may comprise forwarding data according to the tree structure if no routing table exists in the relay node.

The searching the routing table to check whether the routing table stores information on a path up to a parent node of the destination node may include calculating a level in a network by each of entries in the routing table, and calculating a scope of child nodes based on the calculated level; and checking whether the destination node belongs to a calculated scope of child nodes by each entry, and deciding whether the routing table stores information on a path up to a parent node of the destination node.

Further, if plural parent nodes are searched for as a result of the decision, a node nearest to the destination node may be selected as a parent node to which data is forwarded.

If the routing table does not store information on a path up to a parent node of the destination node, a routing request packet may be broadcast to a neighboring node to search for a path. Further, the wireless networks may be Zigbee wireless networks based on the IEEE 802.15.4 standards.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF EXEMPLARY EMBODIMENTS OF THE PRESENT INVENTION

Figure 1:
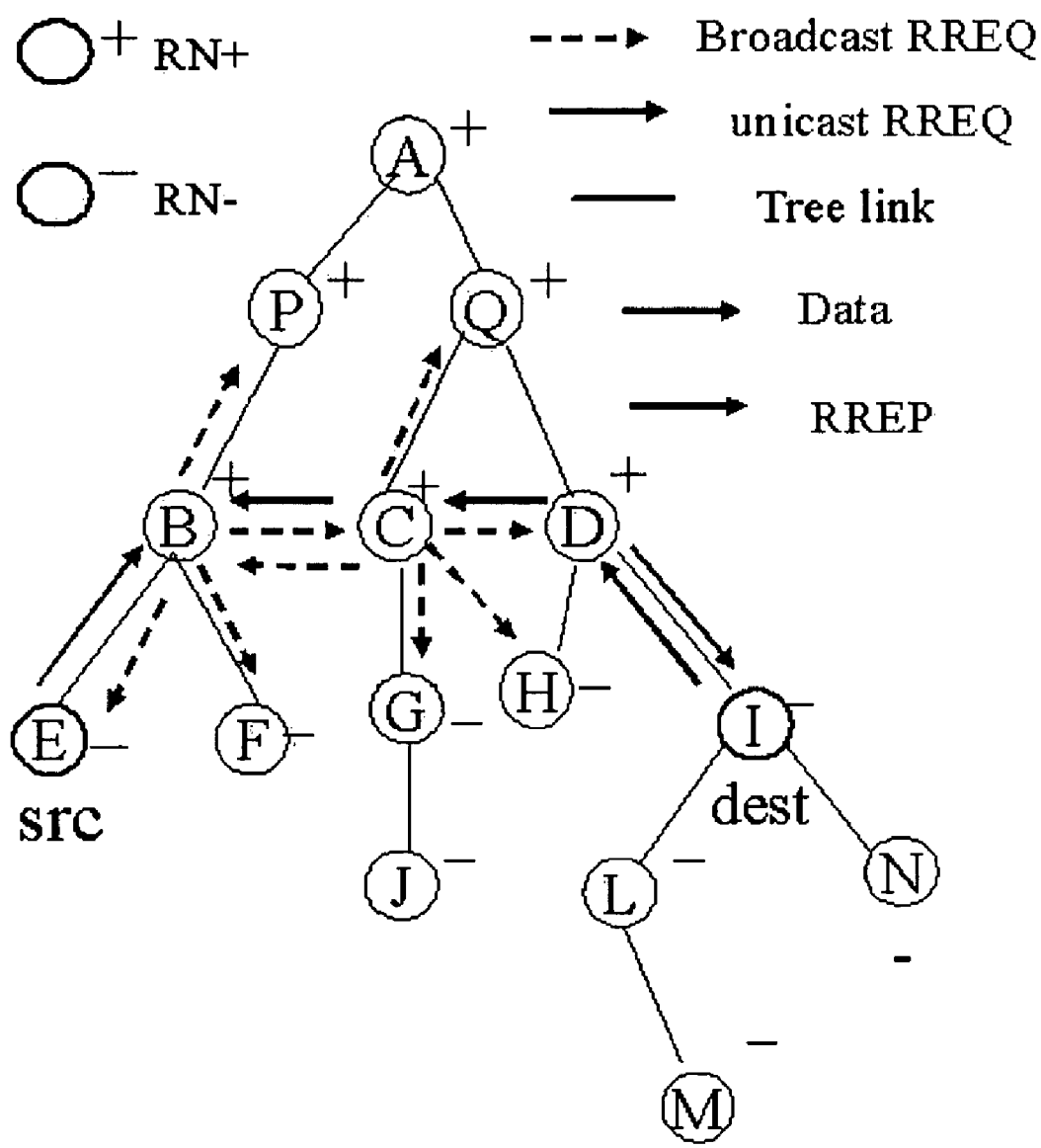
FIG. 1 is a view for explaining a conventional routing method.

Hereinafter, the present invention will be described in detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The routing method according to an exemplary embodiment of the present invention is applied to a Zigbee wireless network of a tree structure based on the IEEE 802.15.4 standards, but not limited to such a network. That is, the routing method can be applied to different wireless networks having the conditions satisfying the present invention.

Figure 2:
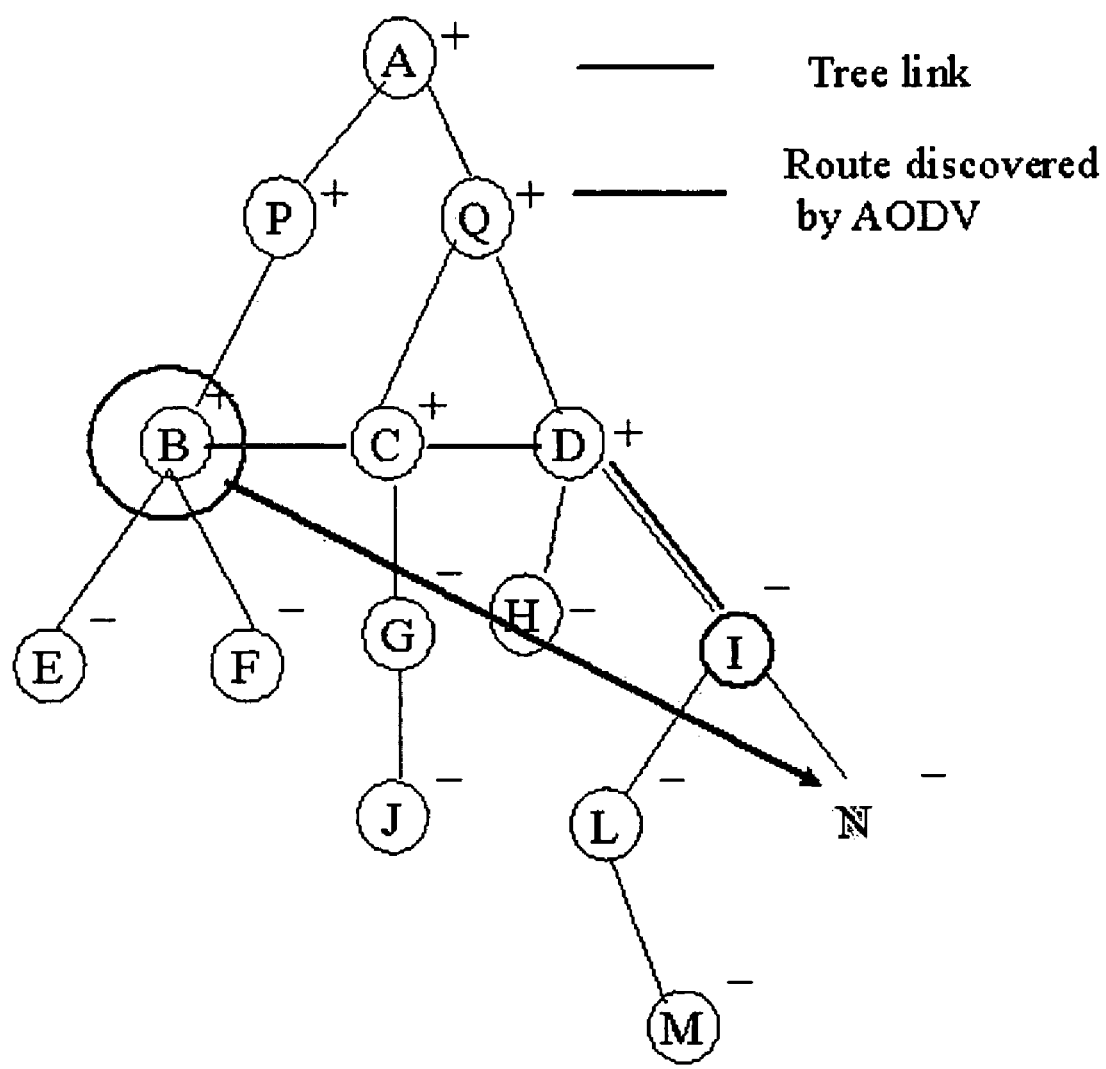
FIG. 2 is a view for conceptually explaining a routing method according to an exemplary embodiment of the present invention.

FIG. 2 is a view for conceptually explaining a routing method according to an exemplary embodiment of the present invention. In FIG. 2, it is assumed that a reference numeral E indicates a source node, a reference numeral N indicates a destination node, and a node B has a routing table which stores previously searched paths to a node I. In this case, the data to be delivered from the node E to the node N is first forwarded to the node B serving as a relay node. The node B searches the routing table to check whether information on paths to the destination node N is stored. As a result of the searches, if the routing table does not have information on paths to the destination node N, the node B searches the routing table for information on paths to the node I being a parent node of the node N according to a procedure to be later described, and, if the information is found, the node B forwards data to the node I being the parent node of the node N. That is, if the routing table stores information on paths to a parent node of a destination node, data is forwarded to the parent node of the destination node without extra path searches. According to the above procedure, if the routing table has information on paths to a parent node of a destination node, data can be rapidly forwarded without broadcasts for searching for a path thereto.

Figure 3:
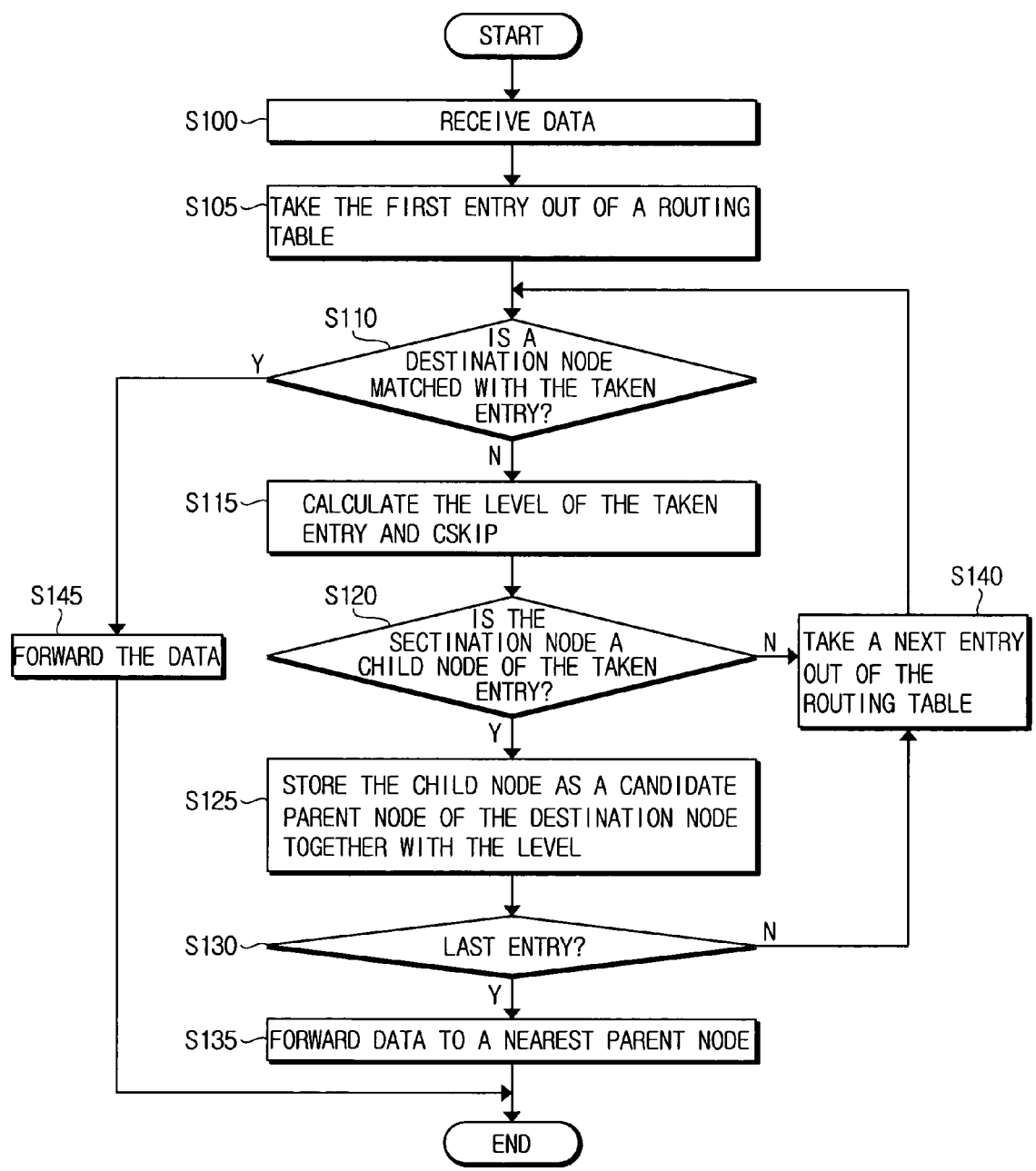
FIG. 3 is a flow chart for explaining in detail the routing method of FIG. 2.
Figure 4:
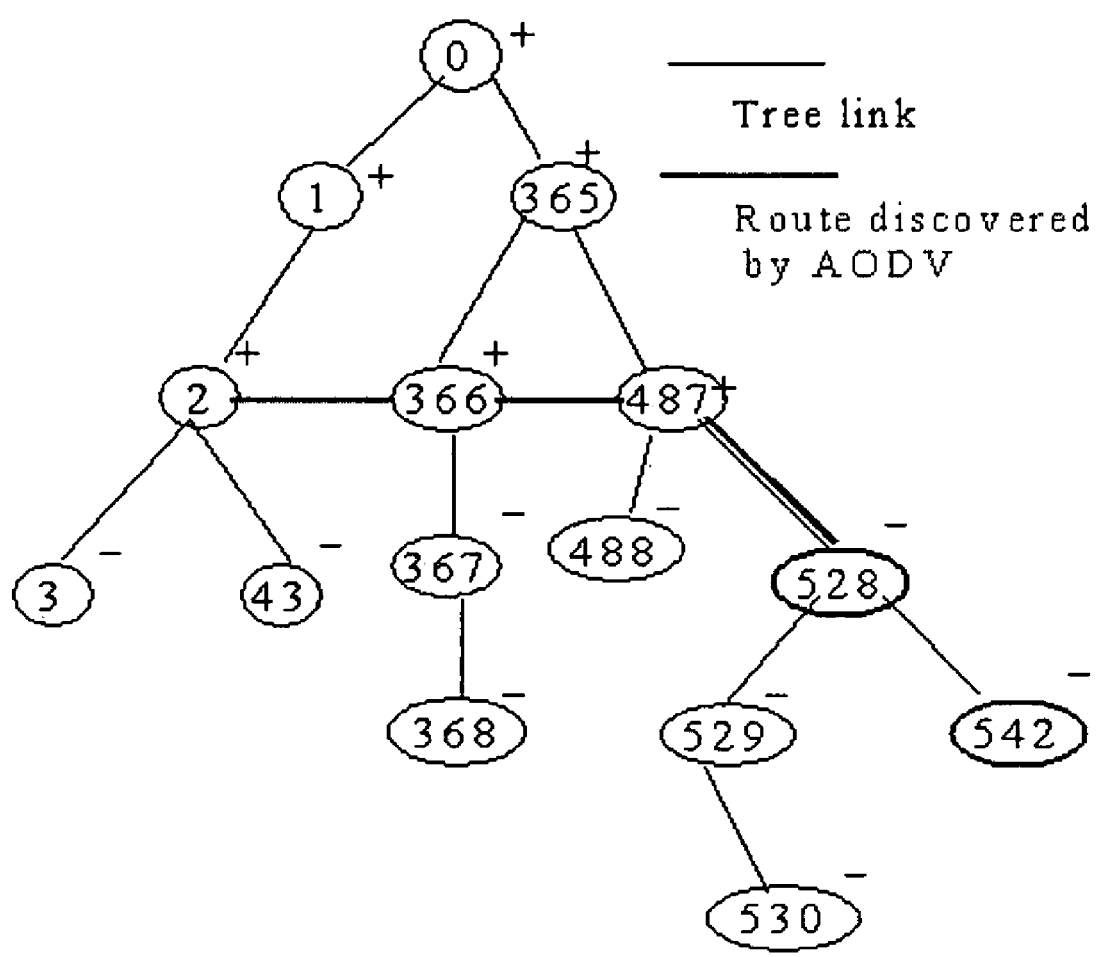
FIG. 4 is a reference view for explaining the routing method of FIG. 2.

FIG. 3 is a flow chart for explaining in detail the routing method of FIG. 2. A network of a tree topology shown in FIG. 4 is provided, for example, for explanation of the routing method of FIG. 2. In FIG. 4, it is assumed that a node 3 is a source node, and a node 542 is a destination node, and a node 2 has a routing table storing a previously searched path to a node 528.

In the above case, the node 2 serving as a relay node receives data to be forwarded from a node 3 to a node 542 (S100). The node 2 takes a first entry out of the routing table (S105), and compares the first entry with the address of the destination node to which the received data is forwarded (S110). Such comparison is made by checking whether the address of the destination node is matched with a value contained in a Destination field of the first entry of the routing table. The following shows the exemplary routing table.

TABLE 1

| Destination | NextHopAddr |
|---|---|
| 528 | 366 |

If a result of the comparison in the step S110 indicates a match, the node 2 forwards the data along a path to the corresponding destination node (S145).

However, if the result of the comparison in the step S110 does not indicate a match, the node 2 calculates the depth or level of the taken entry and Cskip (S115). To do this, Bsize is calculated based on Equation 1 as follows, wherein the Bsize indicates a size of the total address space or block of a network:

$$Bsize = \frac{1 - C_m^{Lm+1}}{1 - C_m},\qquad \text{[Equation 1]}$$

where Cm indicates a maximum number of child nodes that a parent node can have (nwkMaxChildren), and Lm indicates a maximum number of levels in a corresponding network.

If the Bsize is calculated, the Cskip of each level is calculated based on the Equation 2 as follows.

$$Cskip = \text{Floor}\left[\frac{Bsize - \sum_{k=0}^{Li}(C_m)^k}{(C_m)^{Li+1}}\right],\qquad \text{[Equation 2]}$$

where Li indicates the level in a network.

If Cm=3 and Lm=6, the Bsize becomes 1093, and, when the values are used in the Equation 2, the Cskip in each level can be calculated as below.

TABLE 2

| L(i) | Cskip(i) |
|---|---|
| 0 | 364 |
| 1 | 121 |
| 2 | 40 |
| 3 | 13 |
| 4 | 4 |
| 5 | 1 |

Based on the calculated Cskip in each level, the number of child nodes in each level can be determined as follows in Equation 3.

$$\text{Number of children} = \text{Min}[C_m, Cskip_{parent}-1] \qquad \text{[Equation 3]}$$

If the level of a corresponding entry and the Cskip corresponding thereto are calculated in the operation S115, the node 2 checks whether the destination node is a child node of the taken entry (S120). Equation 4 as below is repeatedly used to check whether the destination node is a child node of a corresponding entry.

$$Y(i) = Y(i-1) \bmod Cskip(i) \qquad \text{[Equation 4]}$$

if Y(i)<Lm, then Y is Level of i+1

The node 528 is, for example, taken for explanation.

Y(0)=528 mode Cskip(0)=528 mode 364=164,

Y(1)=Y(0) mode Cskip(1)=164 mode 121=43, and

Y(2)=Y(1) mode Cskip(2)=43 mode 40=3.

Since Y(2)=3–Lm, the level of the node 528 becomes 3. Table 2 shows that Cskip(3)–13 at level 3, so that the child nodes of the node 528 ranges from a node 529 to a node 668 since 528+Cskip(3)*Cm=668. That is, the nodes 529 to 688 become the child nodes of the node 528. If a destination node corresponds to a child node of the taken entry in the operation S120, the child node is stored as a candidate parent node of the destination node together with a corresponding level (S130), the operations S110 to S125 are carried out for a next entry, that is, the operations described as above are repeated with respect to all the entries stored in the routing table. If the above operations are repeated up to the last entry, data is forwarded to a nearest parent node of the stored candidate parent nodes (S135). By the above operations, data can be rapidly forwarded up to the child nodes of the stored nodes, in addition to the destination nodes stored in the routing table, without extra path search operations.

FIGS. 5A to 5E are views for explaining in more detail the procedure of calculating child nodes and levels in the routing method according to an exemplary embodiment of the present invention. First, in the network of a tree structure shown in FIG. 5A, Cm becomes 3 and Lm becomes 4. If such parameters are used in Equation 1, the Bsize becomes 121. If the calculated Bsize is taken into Equation 2, the following Cskip can be obtained as follows in Table 3.

TABLE 3

| L(i) | Cskip(i) |
|---|---|
| 0 | 40 |
| 1 | 13 |
| 2 | 4 |
| 3 | 1 |

Figure 5A:
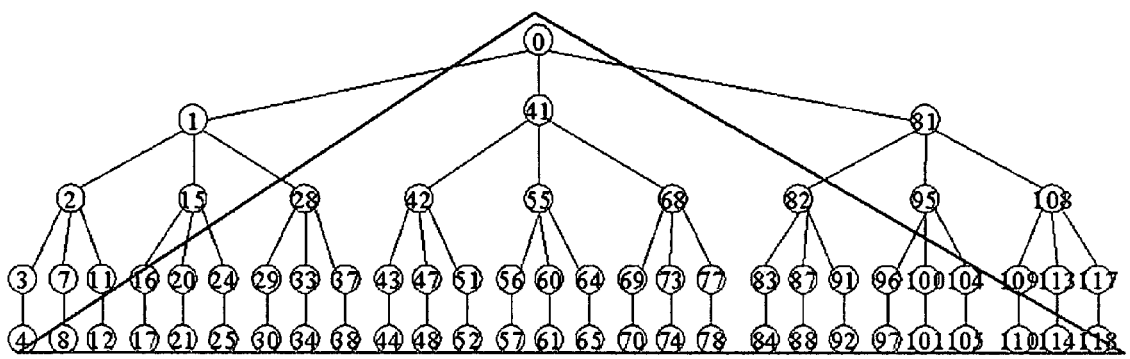
FIG. 5A to FIG. 5E are views for explaining calculation of child nodes and levels in the routing method of FIG. 2.
Figure 5B:
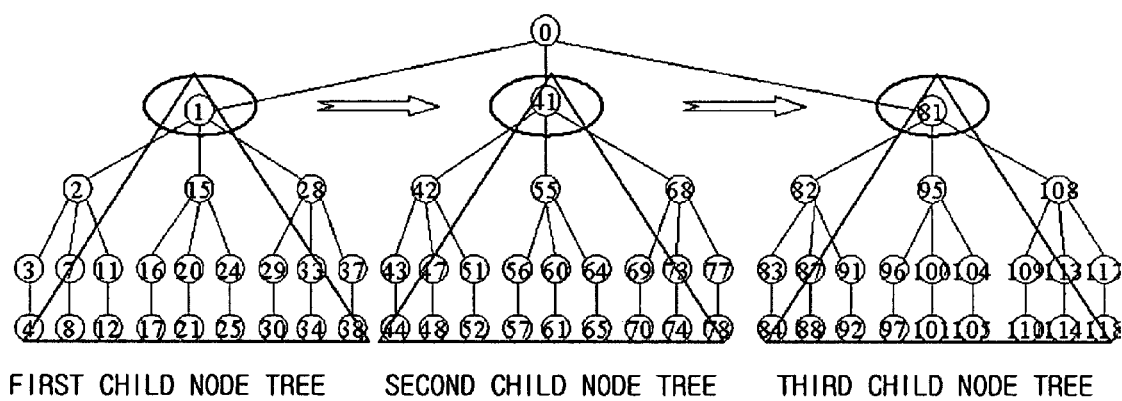

In FIG. 5B, it can be seen that the address of the first child node of the second child node tree is a number obtained by adding Cskip(0)*1 to the number of the first child node of the first child node tree, that is, 1+40*1=41. Likewise, it can be seen that the address of the first child node of the third child node tree is a number obtained by adding Cskip(0)*2 to the number of the first child node of the first child node tree, that is, 1+40*2=81.

Figure 5C:
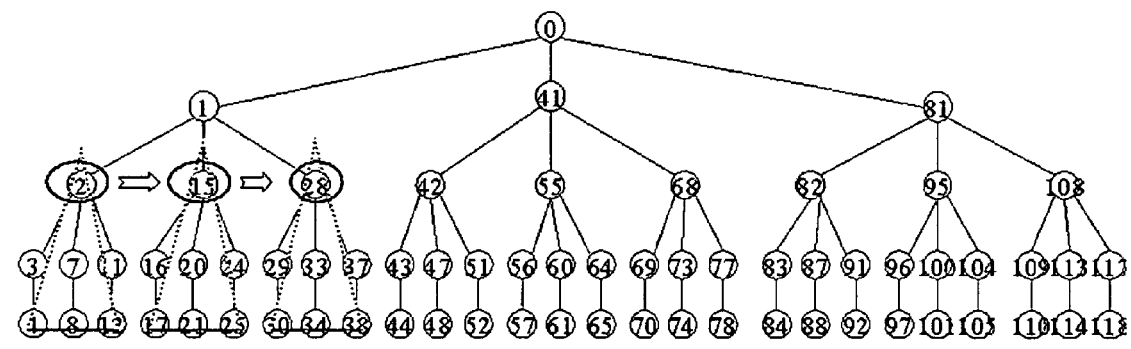

Likewise, in FIG. 5C, the second level of the first child node tree can be calculated by use of Cskip(1). That is, the node 15 is a number obtained by adding Cskip(1)*1 to the node 2, that is, 2+13*1=15, and the node 28 is a number obtained by adding Cskip(1)*2 to the node 2, that is, 2+13*2=28, which indicates that the node 15 is assigned an address of 15 and the node 28 is assigned an address of 28. Accordingly, if Cskip is calculated, the range of child nodes can be calculated, and, even through there exist lower trees infinitely, the lower tree on the same level has a difference to the extent of Cskip corresponding to the level.

Figure 5D:
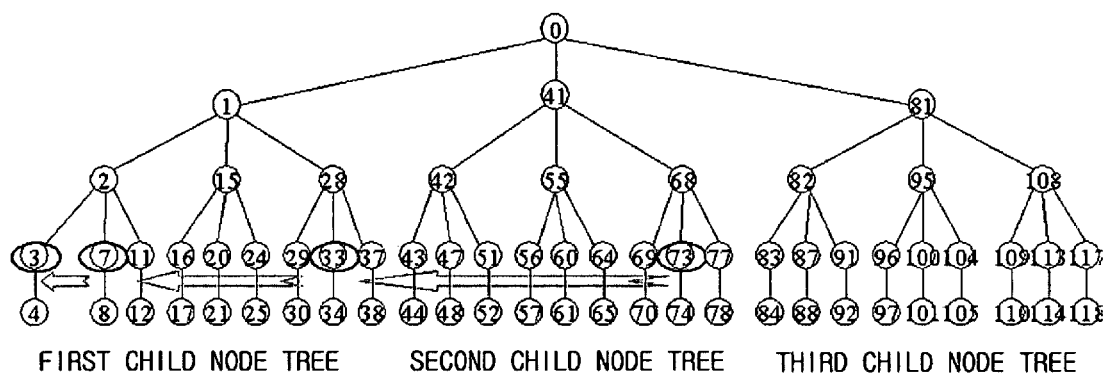
Figure 5E:
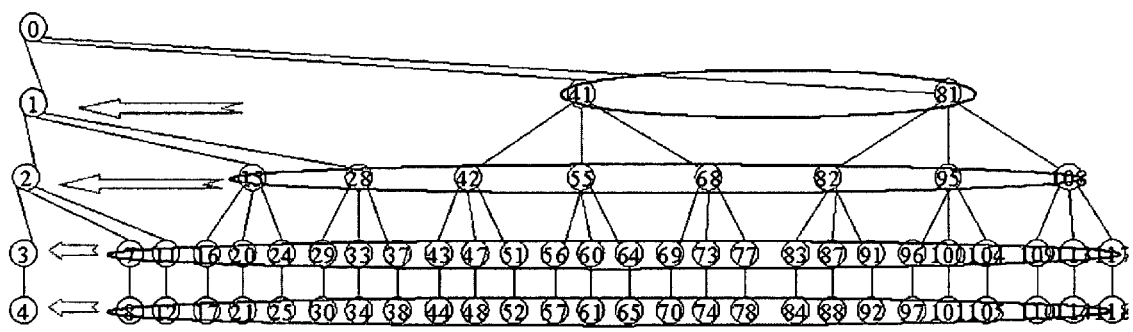

Further, in case of a node 73, the level calculated as above is as follows:
mode Cskip(0)=73 mode 40=33,
33 mode Cskip(1)=33 mode 13=7, and
7 mode Cskip(2)=7 mode 4=3, so the level becomes 3, which means that FIG. 5D has the same result as in FIG. 5E.

Meanwhile, a calculation operation is required to check whether a destination node is a child node of an entry stored in the routing table, but the routing method according to the present invention can determine whether to repeatedly use a path only through simple comparisons without calculations by using fields separately established in the routing table as follows in Table 4.

TABLE 4

| Destination | NextHopaddr | Level | Range of descendant |
|---|---|---|---|
| 1053 | 730 | 3 | 78 |

In here, Level indicates a level in the network, and Range of descendant corresponds to a scope of child nodes that is calculated from a Cskip value.

As aforementioned, when already searched paths can be used, the present invention can reduce the entire network overhead since there is no need of separate search operations through broadcasts.

Further, the present invention can forward data more rapidly since there is no need to wait for path searches when paths previously discovered can be used.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A routing method for establishing a data transfer path between a source node and a destination node in a wireless network having a tree structure, the routing method comprising:
    receiving, by a relay node relaying a data transfer, data to be forwarded from the source node to the destination node;
    forwarding the received data along a corresponding path if a routing table of the relay node stores information on a path to the destination node;
    searching the routing table to check whether the routing table stores information on a path up to a parent node of the destination node if the routing table does not store information on the path to the destination node; and
    forwarding data received along the path up to the parent node if the routing table stores the information on the path to the parent node of the destination node,
    wherein the searching the routing table to check whether the routing table stores information on the path up to the parent node of the destination node includes:
        calculating a level in the network based on each of a plurality of entries in the routing table, and calculating a scope of child nodes based on the level which is calculated; and
    checking whether the destination node belongs to the scope of child nodes based on each entry in the routing table, and deciding whether the routing table stores information on the path to the parent node of the destination node.

2. The routing method as claimed in claim 1, further comprising forwarding data according to the tree structure if there exists no routing table in the relay node.

3. The routing method as claimed in claim 1, wherein, if a plurality of parent nodes are searched for as a result of the deciding, a node nearest to the destination node is selected as the parent node to which data is forwarded.

4. The routing method as claimed in claim 1, wherein, if the routing table does not store information on the path to the parent node of the destination node, a routing request packet is broadcast to a neighboring node to search for the path to the destination node.

5. The routing method as claimed in claim 1, wherein the wireless network is a Zigbee wireless network based on the IEEE 802.15.4 standards.

* * * * *